United States Patent
Sloan et al.

(10) Patent No.: US 7,231,982 B2
(45) Date of Patent: Jun. 19, 2007

(54) PERFORATING GUN QUICK CONNECTION SYSTEM

(75) Inventors: Mark L. Sloan, Bellville, TX (US); Randy C. Schutte, Calgary (CA)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 11/263,090

(22) Filed: Oct. 31, 2005
(Under 37 CFR 1.47)

(65) Prior Publication Data

US 2006/0070738 A1    Apr. 6, 2006

Related U.S. Application Data

(62) Division of application No. 10/703,114, filed on Nov. 6, 2003.

(60) Provisional application No. 60/424,486, filed on Nov. 7, 2002.

(51) Int. Cl.
*E21B 43/119* (2006.01)

(52) U.S. Cl. .................... 166/378; 166/55.2; 403/16

(58) Field of Classification Search ................ 166/378, 166/55.2, 242.6, 242.1, 381, 55, 380, 297; 403/16
See application file for complete search history.

(56) References Cited

U.S. PATENT DOCUMENTS

| | | | | |
|---|---|---|---|---|
| 5,314,014 A | * | 5/1994 | Tucker | 166/124 |
| 5,778,979 A | | 7/1998 | Burleson et al. | |
| 5,823,266 A | | 10/1998 | Burleson et al. | |
| 5,992,523 A | | 11/1999 | Burleson et al. | |
| 6,059,042 A | | 5/2000 | Huber et al. | |
| 6,062,310 A | * | 5/2000 | Wesson et al. | 166/297 |
| 6,098,716 A | | 8/2000 | Hromas et al. | |
| 6,435,278 B1 | * | 8/2002 | Barlow et al. | 166/297 |

* cited by examiner

*Primary Examiner*—Jennifer H Gay
*Assistant Examiner*—Daniel P Stephenson
(74) *Attorney, Agent, or Firm*—Matt W. Carson; Keith R. Derrington

(57) ABSTRACT

A connection system to be used in conjunction with a perforating gun comprising a top sub formed to receive one end of a gun body of a perforating gun, a circumferential groove disposed on the outer surface of the gun body, and a collet secured to the top sub. The collet has at least one finger that engages the groove. Engaging the groove with the at least one finger of the collect connects the gun body to the top sub. A cover sleeve is included that retains the finger in connective engagement with the groove.

10 Claims, 5 Drawing Sheets

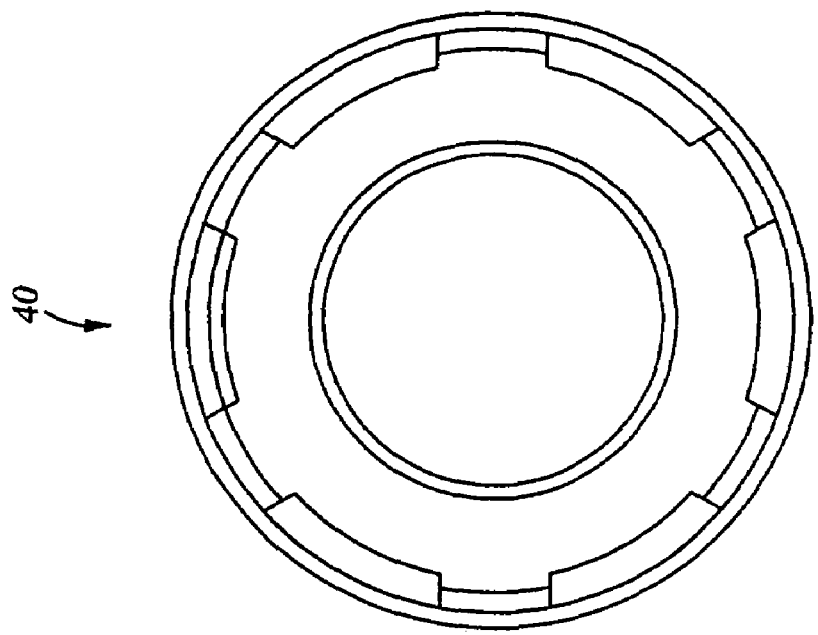
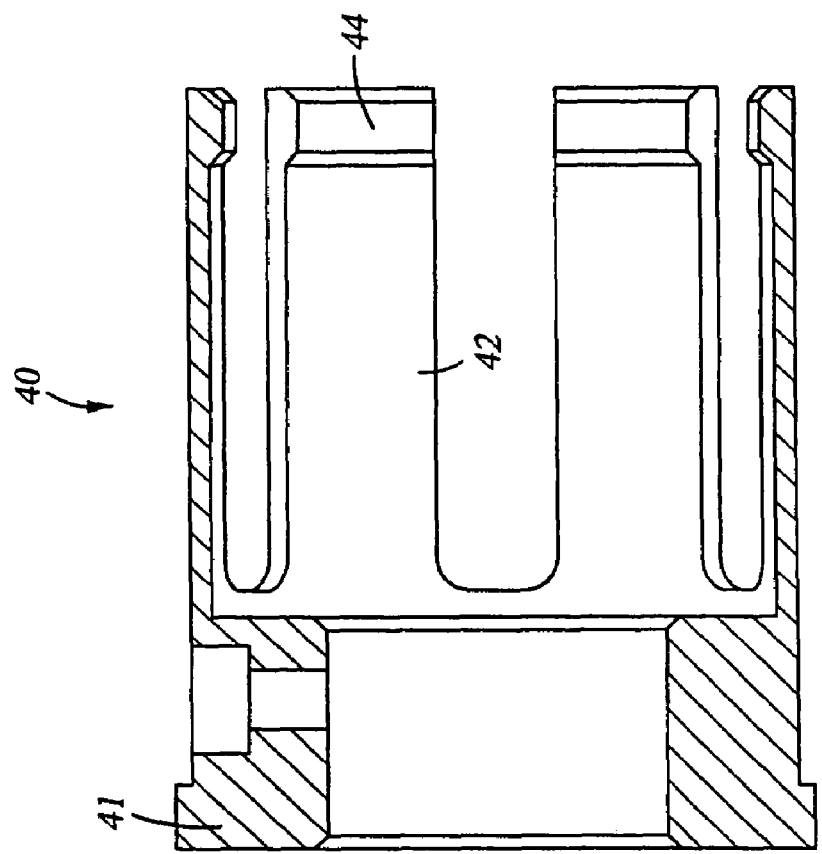
Fig. 3B
Fig. 3A

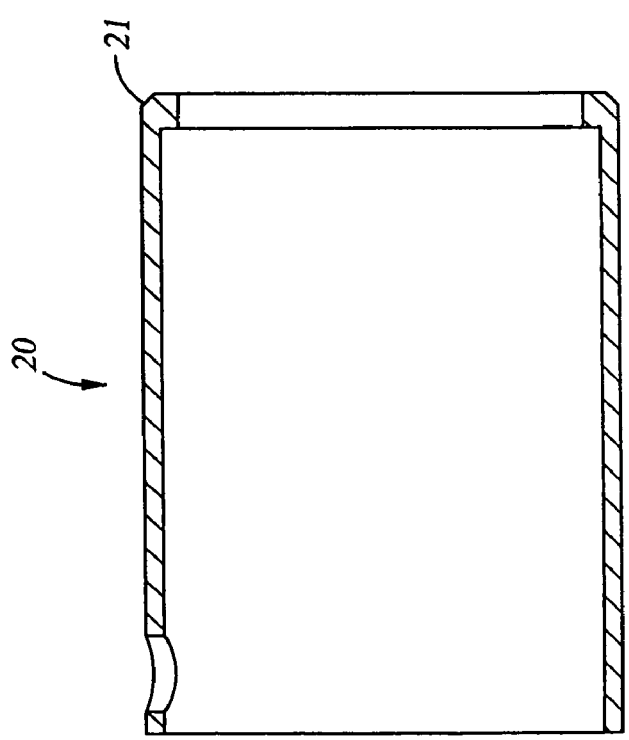
Fig. 5
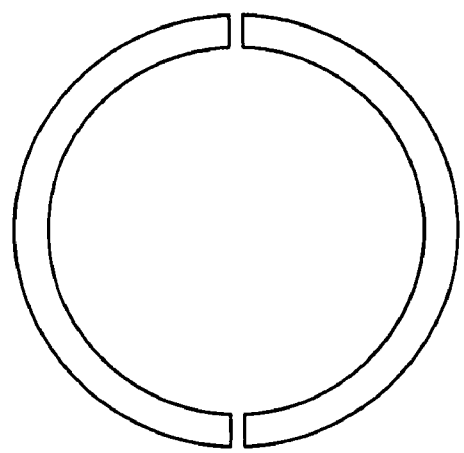
Fig. 6A
Fig. 6B

PERFORATING GUN QUICK CONNECTION SYSTEM

This application is a divisional application of and claims the benefit of regular U.S. patent application Ser. No. 10/703,114 filed Nov. 6, 2003, which claims priority from U.S. Provisional Application No. 60/424,486, filed Nov. 7 2002, the full disclosure of which is hereby incorporated by reference herein.

BACKGROUND OF THE INVENTION

1. Field of the Invention

The invention relates generally to the field of oil and gas well services. More specifically the present invention relates to a connector assembly for a perforating gun that is quick, reliable, and simple to use.

2. Description of Related Art

Perforating guns containing shaped charges are used for the purpose, among others, of making hydraulic communication passages, called perforations, in wellbores drilled through earth formations. These perforations hydraulically connect predetermined zones of the earth formations to the wellbore. Perforations are needed because wellbores are typically completed by coaxially inserting a pipe or casing into the wellbore where the casing is retained in the wellbore by pumping cement into the annular space between the wellbore and the casing. The cemented casing is provided in the wellbore for the specific purpose of hydraulically isolating from each other the various earth formations penetrated by the wellbore. Without perforations, the hydrocarbons entrained in the formations surrounding the wellbore could not flow into the wellbore.

Many different types of perforating guns exist, but most have the same basic components. Those components are, shaped charges, a gun tube, a gun body, a top sub or connector, a detonator, and a bottom sub. Typically the shaped charges are disposed within the gun tube, and the gun tube is inserted into the gun body. The top sub is attached to the upper portion of the gun body and connects the perforating gun to a means for raising and lowering the perforating gun into a wellbore. The bottom sub generally attaches to the lower end of the gun body. Often, the bottom sub houses the detonator within a recess located inside of its body.

When the perforating gun is situated in the portion of the wellbore where a perforation is desired, the shaped charges within the perforating gun are detonated. This in turn produces perforations through the cemented casing lining the wellbore and into the surrounding formation. As is well known in the art, each time a perforating gun is used to produce perforations inside of a wellbore, some of the components of the perforating gun are either expended or fully destroyed. Thus before perforating guns can be reused, they must be returned to the surface and refurbished to replace the parts destroyed or used up during the previous perforation. During its refurbishment the perforating gun usually must be disassembled and reassembled prior to its next deployment.

Part of the disassembly and reassembly process of the perforating gun involves disconnecting the perforating gun from its raising/lowering means; which is typically a wireline. The wireline is attachable to a cablehead, which provides the connection between the perforating gun and the wireline. Wirelines can also serve to provide a signal conduit from the surface to the perforating gun to actuate detonation of the shaped charges. Generally the wireline cablehead is affixed to the upper sub of the perforating gun and is detached during refurbishment of the perforating gun. Additionally, the upper sub is disconnected from the gun body when the expended portions of the perforating gun are replaced. Thus to help minimize the time and expense of refurbishing perforating guns between subsequent uses, it is important that disconnecting and reconnecting the upper sub to the gun body be quick, simple, and be capable of being done at or close to the wellbore.

Often, because of special or uniquely sized components used for a specific perforating application, the perforating gun must be transported to a central processing facility for refurbishment instead of the site where the perforations are performed, i.e. the field. Transportation to and from the field to a central processing facility can be financially expensive as well as costly from a lost time standpoint. On the other hand, if a perforating gun could be refurbished for reuse at a field location, the added expense and time of transportation to a central processing facility could be avoided.

Some examples of perforating guns having connection means can be found in Hromas et al., U.S. Pat. No. 6,098,716, Burleson et al. U.S. Pat. Nos. 5,778,979, 5,823,266, and 5,992,523, and Huber et al., U.S. Pat. No. 6,059,042. However each of these suffer from the drawbacks that they are complex and the connection mechanisms disclosed therein contain multiple moving parts. Additional components add complexity, which reduces reliability and adds capital and maintenance costs. Further, none of the above noted references appears to have the capability of being refurbished or modified in the field, which limits their application to single uses and reduces their flexibility of use.

Therefore, there exists a need for a device or system in connection with perforating guns that provides for a fast and simple method of connecting and disconnecting perforating guns from a wireline. Also the system should allow for the perforating guns to be prepared at a field site, provide for multiple gun lengths, minimize the time required to assemble the perforating gun assembly, and include a proven way of sealing the perforating guns from wellbore fluids.

BRIEF SUMMARY OF THE INVENTION

One embodiment of the present invention discloses a connection system for a perforating gun comprising a top sub formed to receive one end of the gun body of a perforating gun. Disposed on the outer surface of the gun body is a circumferential groove. A collet is securable to the top sub where the collet has at least one finger formed onto its body. The collet finger is produced to engage the gun body groove, which in turn connects the gun body to the top sub. Further included with the present invention is a cover sleeve that circumscribes the finger wedging the finger between the cover sleeve and the groove. Also included with the connection system of the present invention is a seal disposed between the top sub and the perforating gun.

A fastener, such as threaded bolt, screw, rivet, or pin, can be used to secure the collet and cover sleeve to the top sub. The cover sleeve should be freely slideable along the axis of the perforating gun and formed to simultaneously circumscribe the collet and the perforating gun. The magnitude of the inner diameter of the cover sleeve is substantially uniform along its axis up until it reaches a lip of the cover sleeve. The cover sleeve lip is located on the end opposite where the cover sleeve is attached to the collet. The lip protrudes inward toward the axis of the cover sleeve and axially contacts at least one finger.

An alternative embodiment of a connection system for a perforating gun comprises a top sub formed to receive one end of a gun body of a perforating gun. A groove is circumferentially disposed on the outer surface of the gun body. Also included is a cover sleeve attachably detachable to the top sub on one end and having an inwardly protruding lip on the other end. Mating threads on the cover sleeve and on the top sub can be used to secure the cover sleeve to the top sub. A ring is disposed within the groove having an outer diameter that is at least equal to the inner diameter of the lip. Thus upon attachment of the cover sleeve to the top sub, the lip engages the ring. The engagement of the lip to the ring secures the gun body to the top sub. The ring is comprised of at least two hemispherical sections.

One of the many features of the present invention involves providing a fast and simple method of connecting perforating guns. The present invention also provides for perforating guns to be assembled at field locations and allows for random length of gun hardware. Further, the time and expense required to assemble/reassemble perforating guns is reduced by utilization of the present invention.

BRIEF DESCRIPTION OF THE SEVERAL VIEWS OF THE DRAWING

FIG. 3A illustrates a cross-sectional view of a collet.

FIG. 3B illustrates an axial view of a collet.

FIG. 5 illustrates a cross-sectional view of a cover sleeve.

FIG. 6A illustrates an axial view of a ring.

FIG. 6B illustrates a cross-sectional view of a ring.

DETAILED DESCRIPTION OF THE INVENTION

Figure 1:
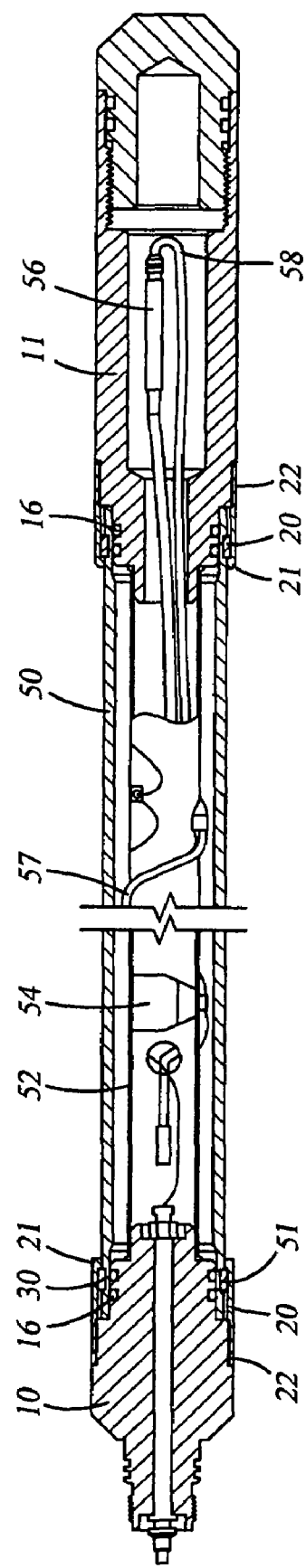
FIG. 1 illustrates a partial cross-sectional view of a perforating gun connection assembly having a split ring.

With reference to the drawings herein, a perforating gun quick disconnect system according to one embodiment of the present invention is illustrated in FIG. 1. For purposes of reference, bottom or lower refers to portions of the perforating gun located closer to the bottom of the wellbore, whereas top or higher refers to portions of the perforating gun situated closer to the wellbore opening. In one embodiment of the invention as shown in FIG. 1, a top sub 10 is secured to the upper end of a gun body 50. Seals 16 are provided on the outer radius of the top sub 10 and contact the inner radius of the upper section of the gun body 50.

Figure 2:
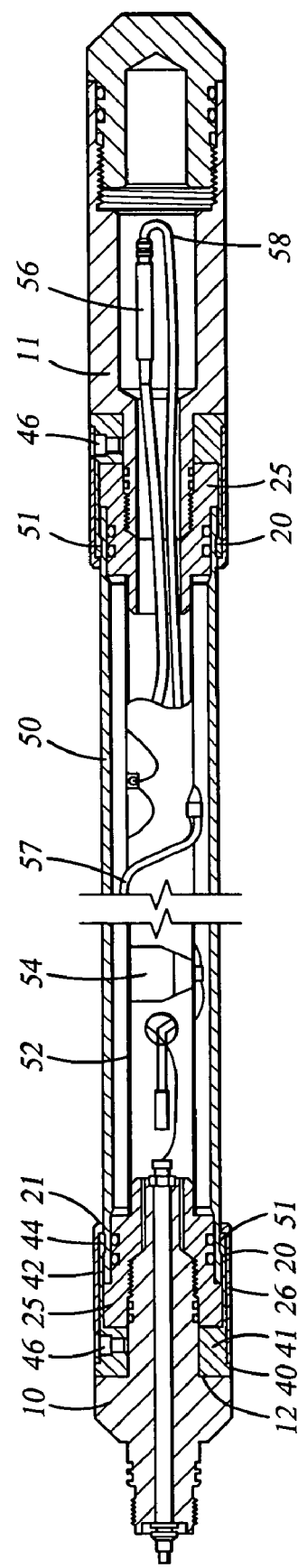
FIG. 2 depicts a cross-sectional view of a perforating gun connection assembly having a collet.
Figure 4:
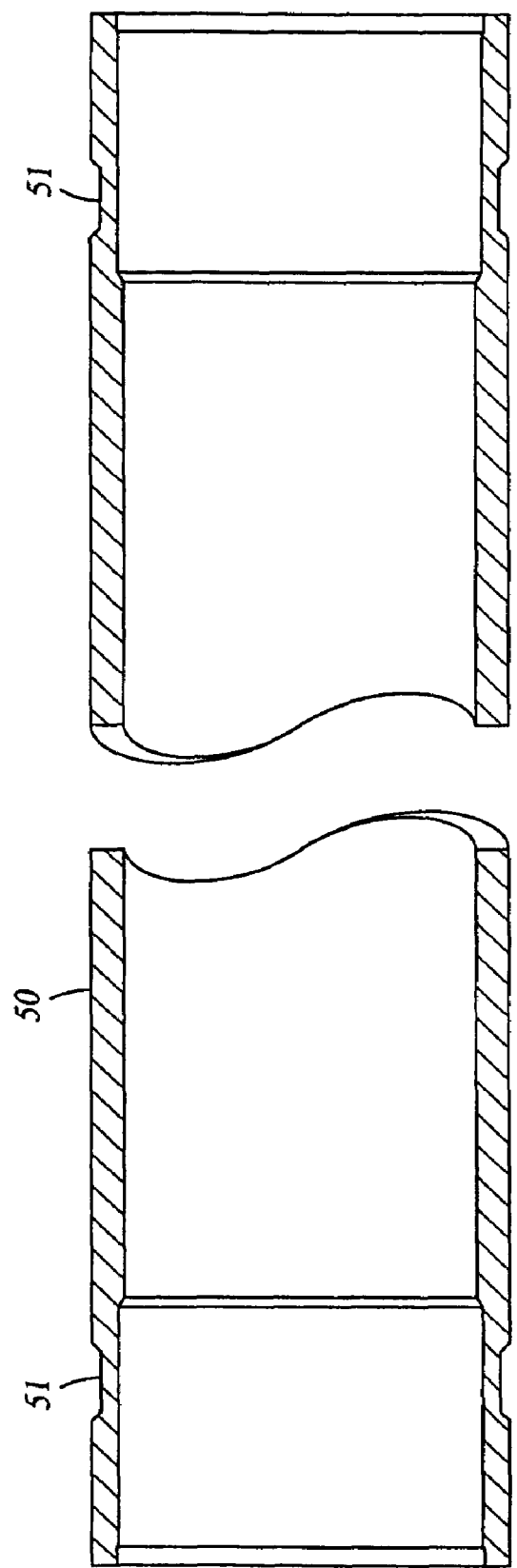
FIG. 4 illustrates a cross-sectional view of a gun body.

In the embodiments illustrated in FIGS. 1 and 2, the top sub 10 is substantially cylindrical with a varying diameter, and preferably with its diameter being largest at its midsection. With regard to the embodiment of FIG. 2, it is preferred that the diameter of the top sub 10 be substantially equal to the collet base 41. Just below the top sub 10 mid-section, its diameter reduces to form a shoulder 12 on which the collet base 41 is secured. An annular retainer 25 is attachable to the lower portion of the top sub 10. It is preferred that the outer radius of the upper section of the retainer 25 be substantially the same as the inner radius of the collet fingers 42. However, the radius at the lower section of the retainer 25 should be smaller than the radius of the collet fingers 42. The reduced diameter along the lower section of the retainer 25 creates an annular space between the collet fingers 42 and the retainer 25. That annular space should be formed such that it is capable of accommodating the upper portion of the gun body 50 along a portion of its lenght.

In an embodiment of the invention of FIG. 1, a ring 30 is shown situated inside of a groove formed on the outer radius of the upper section of the gun body 50. The ring 30 is preferably comprised of at least two hemispherical sections that when placed into the groove on the gun body 50, the ring 30 can circumscribe substantially the entire diameter of the gun body 50. Alternatively the ring 30 can be comprised of a single section that is press fit into the groove, or be of three or more sections. A cover sleeve 20 is shown circumscribing a portion of the top sub 10 and a portion of the gun body 50. A cover sleeve lip 21 is formed on the bottom of the cover sleeve 20 having a radius substantially similar to the radius of the ring 30. The cover sleeve lip 21 protrudes inward toward the axis of the cover sleeve 20. The presence of the cover sleeve lip 21 adjacent the ring 30 can prevent the ring 30 from axially moving downward past the cover sleeve lip 21. Threads 22 on the top of the cover sleeve 20 at its inner diameter are formed to mate with corresponding threads located on the outer diameter of the top sub 10, thus providing a threaded connection between the cover sleeve lip 21 and the top sub 10. It is important that the cover sleeve 20 inner radius be formed to allow it to easily axially traverse the gun body 50, and yet leave only a small clearance between it and the outer diameter of the ring 30.

Also included with this embodiment of the invention are a shaped charge 54, a gun tube 52, and a detonator 56. The form and type of the top sub 10, lower sub 11, seals 16, detonating cord 57, gun body 50, and detonator 56 can vary from those illustrated here without departing from the spirit of the present invention.

Assembly of the perforating gun of FIG. 1 generally involves first loading the gun tube 52 with shaped charges 54 using approved ballistic procedures. The detonator cord 57 and associated electrical wire 58 is routed along the path of the ignition points of the charges. The gun tube 52 is then inserted into the gun body 50. The cover sleeve 20 is slid over the gun body 50 and the top sub 10 is inserted into an opening on the upper portion of the gun body 50. The ring 30 is placed into the groove 51 on the gun body 50. The presence of the ring 30 prevents the cover sleeve lip 21 from sliding above the ring 30. Due to the small clearance between the inner diameter of the cover sleeve 20 and the outer diameter of the ring 30, the ring 30 is secured in place inside of the groove 51. It is to be understood that one skilled in the art can determine the clearance between the ring 30 and the cover sleeve 20 necessary to secure the ring 30 within the groove 51.

To complete the assembly process, the cover sleeve 20 is slid upwards toward the top sub 10 and screwed onto the top sub 10 by virtue of the threads 22 disposed on the cover sleeve 20 and the top sub 10. It is important that the sub seals 16 mate up against the inner diameter of the opening of the gun body 50 to prevent fluid leakage from the wellbore to the inside of the gun body 50. As is well known, if wellbore fluids enter the inside of the gun body 50, the fluids can either damage the shaped charges 54 before detonation, or cause the gun body 50 to split upon detonation of the shaped charges 54.

Another embodiment of the present invention is illustrated in FIG. 2. In this embodiment, the ring 30 and threads 22 of the embodiment of FIG. 1, are replaced by a collet 40 and a collet fastener 46. The collet 40 is formed to fit over a portion of the top sub 10 and is securable to the top sub 10. The features of the collet 40 include a collet finger 42 with a collet finger insert 44. The collet finger insert 44 is fashioned to fit within the groove 51 formed on the upper portion of the top sub 10. Also included with this embodiment is a cover sleeve 20 having inner diameter that is sufficiently large to easily slide over the collet finger 42. While the present invention can be equipped with one or more collet fingers 42, it is preferred that the number of collet fingers 42 be six. Further, it is also preferred that the collet fingers 42 be radially displaced around the collet 40 with an equal distance between each adjacent collet finger 42.

Assembly of the embodiment of the invention shown in FIG. 2 is much the same as the embodiment of FIG. 1. The difference lies in how the gun body is secured to the top sub 10. In the embodiment of the invention illustrated in FIG. 2, the collet 40 is secured to the top sub 10 before insertion of the gun body 50 into the top sub 10. Insertion of the gun body 50 into the top sub 10 positions the collet finger insert(s) 44 adjacent the groove 51 on the gun body 50 where the collet finger insert(s) 44 can then fit into the groove 51. As can readily be seen from FIG. 2, upon assembly of the present invention, the axis of the collet 40 should be substantially aligned with the axis of the gun body 50.

Because the collet finger insert(s) 44 is designed to mate inside of the groove 51, the distance from the collet axis to the collet finger insert(s) 44 is equal to the distance from the groove 51 to the collet axis. Since the outer radius of the gun body 50 is greater than the distance from the groove 51 to the collet axis, the collet finger insert(s) 44 must be urged axially outward before the gun body 50 is inserted into the top sub 10. Application of a sufficient upward axial force to the gun body 50 will temporarily bend the collet finger insert(s) 44 outward; thus out of the way of the gun tube 50. Radial displacement of the collet finger insert(s) 44 allows the gun tub 50 to fit inside of the top sub 10. To ensure ease of use and a quick turnaround time, the force required to insert the gun body 50 within the collet finger(s) 42, or retract the gun body 50 from the grasp of the collet finger(s) 42, should not exceed approximately 50 pounds force. Thus material selection of the collet finger(s) 42 as well as the size of the collet finger(s) 42 is dictated by this requirement. It is believed that one skilled in the art can choose the proper dimensions and material of a collet finger(s) 42 without undue experimentation.

Once the collet finger insert(s) 44 are within the groove 51, the cover sleeve 20 can then be slid upward such that the body of the cover sleeve 20 surrounds the collet finger(s) 42 and collet finger insert(s) 44. The inner diameter of the cover sleeve 20 retains the collet finger insert(s) 44 within the groove 51 on the gun body 50. The cover sleeve 20 can be secured to the collet 40 by a threaded fastener 46. However any number of other attachment devices can be employed, such as rivets, pins, or a series of mating threads on the inner diameter of the cover sleeve 20 and the outer diameter of the collet 40. Firmly securing the collet finger insert(s) 44 inside the groove 51 provides a connection between the top sub 10 and the gun body 52. This in effect connects the perforating gun to the wireline.

The present invention could employ a single cover sleeve 20 in conjunction with a single groove 51 formed on the upper or the lower portion of the gun body 50. This would result in a quick disconnect system for either the top sub 10 or the bottom sub 11, but not both subs simultaneously. However, a cover sleeve 20 and groove 51 on both ends of the gun body 50 allows for quick and simple removal, as well as attachment, of both the top sub 10 and the bottom sub 11 from the gun body 50. Thus, it is preferred that the grooves 51 be provided on the gun body 50 at both its upper and its lower end.

Assembly of a perforating gun could be done with a groove 51 far from either end, but this would require a long collet finger(s) 41 and an elongated cover sleeve 20. Since a long collet finger(s) 41 or a long cover sleeve 20 can increase the time and effort required to assemble and disassemble the perforating gun, it is preferred that the groove 51 be positioned close to its associated sub.

One of the many advantages of the present invention is realized during disassembly of the associated perforating gun. Just as the perforating gun having the present invention can be quickly and easily assembled, it can also be quickly and easily disassembled. Once the shaped charges 54 have discharged and the perforating gun is removed from the wellbore, the collet fastener 46 can be removed and the gun body 50 can be detached from the top sub 10. Detaching the gun body 50 from the top sub 10 of the present invention does not involve the use of tools but instead can be performed manually—simply by pulling the gun body 50 away from the top sub 10. More importantly, this function can be done in the field, thus eliminating the need to transport the perforating gun to a central processing facility. A loaded perforating gun can then be reattached to the top sub 10 and the perforating process can be repeated immediately.

The material selection of the gun body 50, ring 30, and collet 20 is important. Due to the large impulse forces encountered during use by each of these components, they should be constructed of a material that does not easily yield, either momentarily or permanently. Even small amounts of yield during use can cause the gun body 50 to bond to the collet finger insert(s) 44. Which is highly undesirable since quick disassembly is important when refurbishing perforating guns. The proper material of the gun body 50, ring 30, and collet 20 can be determined by one skilled in the art and without undue experimentation.

The bottom sub 11 of the embodiment of the present invention of FIG. 2 can be attached to the gun body 50 in much the same fashion as the top sub 10. However, because of the detonator 56, safety procedures typically require that the detonator 56 be connected while the detonator 56 is in a blast shield outside of the gun assembly. The detonator 56 is then connected to the detonating cord 57.

One of the many advantages of the present invention is the efficient manner in which the perforating gun can be assembled and disassembled, either for its initial use or for subsequent uses. The present invention enables the assembly/disassembly of the perforating guns to be done at either a primary manufacturing site, or in a remote field site. Thus use of the present invention eliminates time wasted to transport perforating guns to a primary manufacturing site for processing, saves money associated with transporting perforating guns, and reduces the time and effort required to assemble/disassemble perforating guns, either in the field, or at a manufacturing facility. For example, the present invention allows the user the flexibility of forming the groove 51 onto the gun body 50 in the field with a lathe or other machining device. The gun body 50 with its newly formed groove 51 can then be attached to the top sub 10, while still in the field, inserted into a wellbore, and have the shaped charges within the gun body 50 detonated. After the perforating gun is raised up and out of the wellbore, a new gun body 50, with a newly formed groove 51 can be switched into the present invention and the perforating process repeated. This provides one example of how use of the present invention allows many functions to take place in the field and reduces the need for machining at a manufacturing site, which in turn reduces costs, effort, and time associated with transportation and engineering coordination.

A further advantage of the present invention is that the top sub 10 can be disconnected from the perforating gun without the need to disconnect the wireline. This not only saves time, but can reduce possible infield anomalies caused by mistakes in the attachment/detachment during use of the perforating gun. In addition to a cost and time savings, the present invention also is flexible in its application. Use of the present invention is not limited to a single perforating gun of a single length. Instead the present invention can be implemented on perforating guns of any length.

The present invention described herein, therefore, is well adapted to carry out the objects and attain the ends and advantages mentioned, as well as others inherent therein. While a presently preferred embodiment of the invention has been given for purposes of disclosure, numerous changes are possible in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A perforating gun connector comprising:
   a top sub formed to receive one end of a gun body;
   a circumferential groove disposed on the outer surface of the gun body;
   a cover sleeve attachably detachable to said top sub on one end and having an inwardly protruding lip on the other end; and
   a ring disposed within said groove having an outer diameter greater than the inner diameter of said lip such that upon attachment of said cover sleeve to said top sub said lip slidingly engages said ring thereby securing the gun body to said top sub and upon detachment of said cover sleeve from said top sub, said lip slidingly disengages said ring at a plane that is perpendicular to the axis of the ring.

2. The perforating gun connector of claim 1 wherein said ring is comprised of at least two hemispherical sections.

3. The perforating gun connector of claim 1 wherein said cover sleeve is attachable to said top sub by a series of mating threads formed onto said top sub and said cover sleeve.

4. The perforating gun of claim 1 further comprising a bottom sub formed to receive the other end of the gun body, a second circumferential groove disposed on the outer surface of the gun body proximate to the other end of the gun body, a second cover sleeve attachably detachable to said bottom sub on one end and having an inwardly protruding lip on the other end, and a second ring disposed within said second circumferential groove having an outer diameter at least as large as the inner diameter of said lip on said second cover sleeve such that upon attachment of said second cover sleeve to said bottom sub said lip on said second cover sleeve slidingly engages said second ring thereby securing the gun body to said bottom sub and upon detachment of said second cover sleeve from said bottom sub, said cover sleeve slidingly disengages said second ring.

5. The perforating gun connector of claim 4 wherein said second ring is comprised of at least two hemispherical sections.

6. The perforating gun connector of claim 4 wherein said second cover sleeve is attachable to said bottom sub by a series of mating threads formed onto said bottom sub and said second cover sleeve.

7. A method of using a perforating gun in combination with a top sub comprising:
   forming at least one circumferential groove on the outer surface of a gun body;
   sliding a cover sleeve on the gun body having a lip on one end, said lip extending toward the diameter of said cover sleeve;
   threading a portion of the inner circumference of said cover sleeve and threading a portion of the outer diameter of the top sub formed to threadingly connect with the threads formed on the inner circumference of said cover sleeve;
   inserting a ring within said at least on circumferential groove, wherein the outer diameter of said ring is greater than the outer diameter of said gun body and the inner diameter of said lip;
   inserting the gun body into the top sub; and
   attaching said cover sleeve to the top sub by mating the corresponding threads located on the inner surface of said cover sleeve with the threads on the outer diameter of the top sub wherein a side surface of said lip is disposed adjacent an opposing side surface of said ring, wherein the side surface and the opposing side surface both lie in a plane perpendicular to the axis of the ring, and wherein the lip slides along the outer surface of the gun body for engagement of the side surface with the opposing side surface.

8. The method of claim 7 further comprising adding at least one shaped charge to the perforating gun and inserting the perforating gun into a wellbore.

9. The method of claim 7, wherein the perforating gun includes shaped charges, said method further comprising detonating shaped charges and removing the perforating gun from the wellbore.

10. The method of claim 7 further comprising detaching said cover sleeve from the top sub, sliding said cover sleeve away from said top sub, and detaching the gun body away from said top sub.

* * * * *